United States Patent

[11] 3,547,368

[72] Inventor John S. Veach
Cincinnati, Ohio
[21] Appl. No. 781,339
[22] Filed Dec. 5, 1968
[45] Patented Dec. 15, 1970
[73] Assignee Sperry Rand Corporation
New York, N.Y.
a corporation of Delaware

[54] TAKE-UP REEL FOR USE IN A SELF THREADING SYSTEM
10 Claims, 9 Drawing Figs.

[52] U.S. Cl. 242/74.2
[51] Int. Cl. B65h 75/28
[50] Field of Search 242/74.2, 74.1, 74

[56] References Cited
UNITED STATES PATENTS

| | | | |
|---|---|---|---|
| 3,297,272 | 1/1967 | Dekker | 242/74.2 |
| 3,304,022 | 2/1967 | Caffe | 242/74.2 |

*Primary Examiner*—Nathan L. Mintz
*Attorneys*—Marshall M. Truex, Frank A. Seemar and Griffin, Branigan and Kindness

ABSTRACT: A reel comprising a notched hub or core mounted on a plate is described. Mounted atop of the hub and attached to the plate by a spring is a wiper arm. A tape having a T-shaped end is caught and moved by the wiper arm so as to engage the end of the tape in the notch. As the tape wraps around the hub, the wiper arm is raised to a nonengaging position due to force created against a projecting member of the wiper arm when the tape wraps around the core.

INVENTOR
John S. Veach

BY Griffin Branigan & Kindness
ATTORNEYS

INVENTOR
John S. Veach

BY
Griffin Branigan & Kindness
ATTORNEYS

TAKE-UP REEL FOR USE IN A SELF THREADING SYSTEM

BACKGROUND OF THE INVENTION

Various types of prior art takeup reels for use with self-threading tape and film systems have been proposed and are in use. The reels range from simple reels wherein the film tape is projected into the reel and wraps around the hub due to friction and film end curvature. It will be appreciated that if there is a lack of friction or film end curvature, these systems will not operate satisfactorily. On the other end of the range are reels having a means for moving the film from the edge of the reel into the hub. The means holds the end of the film near the hub until the film starts to wrap around the hub, thereafter, the means is moved out of engagement with the film. A reel of the latter nature is illustrated and described in U.S. Pat. No. 3,312,407 issued to Abraham A. Goldberg.

While reels of the type described in the above above-noted patent are useful, they leave certain unresolved problems. For example, the usual means for moving the film from the edge to the hub of the reel is an arm that engages the end of the film. As the film moves inwardly and wraps around the hub of the reel, the edge of the film raises the arm. It will be appreciated that the edge of a film or tape is weak, hence, it can only apply a small amount of pressure to the arm. Consequently, the pressure forcing the arm downward must be weak, thereby making the reel structure delicate. In addition, due to the weak forces involved, the arm is likely to bounce during use. Further, after the reel has been used for a period of time, the edge of the film tends to wear down and hence, cannot always perform its arm raising function in the desired manner.

In addition to problems with arm movement, systems of the type described in the foregoing patent can be dangerous. Specifically, when the arm is raised to its rest point considerably above the upper portion of the reel, and the reel is spun in a rapid fashion, the arm whips through the air. Hence, the arm can be dangerous, to a person using a system including this reel. And, even if not dangerous, the arm is likely to collide with any objects brought near to the reel so that either the object is destroyed or the object destroys the arm.

Therefore, it is an object of this invention to provide a new and improved takeup reel for use with a self-threading tape or film system.

It is also an a object of this invention to provide a new and improved takeup reel for use with a self-threading tape or film system that is less delicate and, therefore, more reliable over extended periods of time than prior art takeup reels.

It is a still further object of this invention to provide a new and improved takeup reel for use with a self-threading tape or film system that is less dangerous than prior art takeup reels.

It should also be noted, that a takeup reel for use in self-threading or film systems must be uncomplicated and inexpensive to manufacture if it is to have widespread use. Therefore, it is a still further object of this invention to provide a new and improved takeup reel that is uncomplicated and inexpensive to manufacture.

SUMMARY OF THE INVENTION

In accordance with a principle of this invention, a novel takeup reel for use in a self-threading film or tape system is provided. The reel includes a notched hub having attached to the top of the hub a spring-loaded rotatable arm. The arm catches the end of a tape and directs it into the notch. As the tape wraps around the hub it coacts with means connected to the arm to move the arm out of engagement with the tape.

In accordance with a further principle of this invention, the arm is generally T-shaped, having a downwardly projecting elbow, and fits into a slot in the hub. The elbow extends outwardly from the side of the hub when tape is not wrapped around the hub. When tape or film is wrapped around the hub it coacts with the elbow to raise the arm, against the pressure created by the spring, out of engagement with the tape or film.

In accordance with a further principle of this invention, a pivot block is included and attached to the arm and the hub. The pivot block projects outwardly from the hub and the arm is pivotally attached to the pivot block at a point remote from the hub so that a long lever arm is provided.

In accordance with a still further principle of this invention, a bottom plate is included for aiding in directing the tape into the notch.

It will be appreciated from the foregoing description that the invention provides an uncomplicated and, therefore, inexpensive takeup reel for use in self-threading film or tape systems. Because the system uses a lever arm that is moved out of an engaging position due to tape wraparound, it is more reliable than prior art systems wherein tape edge pressure is used to lift the arm out of engagement. Further, the use of wraparound pressure to move the arm, rather than edge pressure, results in a system that can be formed with less precise components. In addition, by using a pivot block in combination with a hub, a long lever arm is provided that can be moved out of film or tape engagement without being raised to a dangerous position.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

FIGS. *3a—3e* are top pictorial diagrams illustrating a sequence of operation wherein a tape is automatically wound around the hub of the takeup reel of the invention; and, FIGS. *4a* and *4b* are side cross-sectional diagrams further illustrating the wrapping of a tape around the hub of the takeup reel of the invention.

DESCRIPTION OF THE PREFERRED EMBODIMENT

Figures 1, 2, 3A:
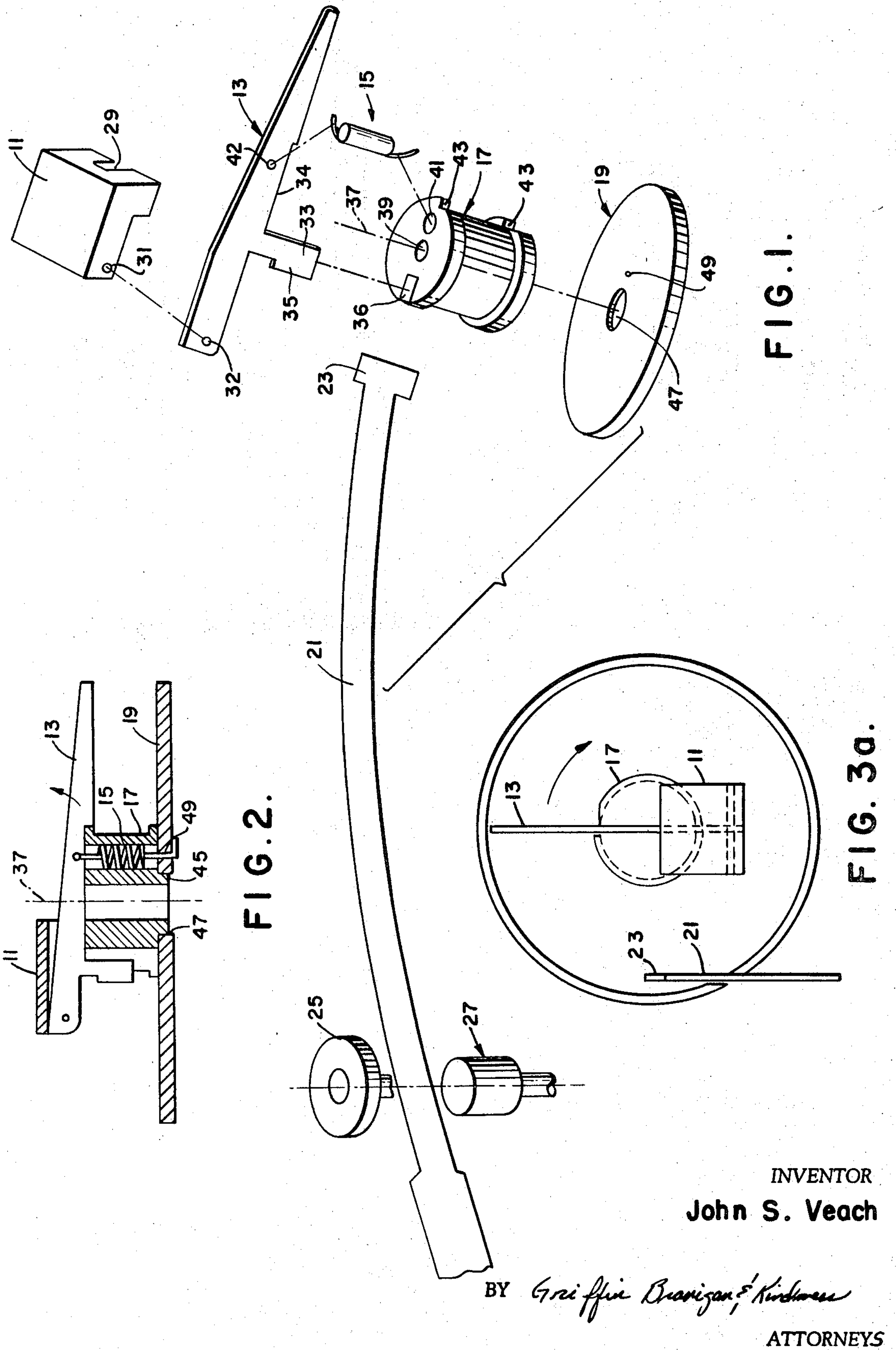
FIG. 1 is an exploded pictorial diagram illustrating a preferred embodiment of the invention.
FIG. 2 is a side cross-sectional diagram illustrating the component parts of FIG. 1 mounted in their operative positions.

FIG. 1 is an exploded pictorial diagram of the invention and comprises: a pivot block 11; an arm 13; a coil spring 15; a hub 17; and, a plate 19. Also illustrated is a tape or film 21 having a T-shaped end 23 passing between a drive roller 25 and a capstan 27. The pivot block 11 is generally a box shaped and has a slot 29 passing from one side to the other side in which the arm 13 fits in the manner illustrated in FIG. 2. An aperture 31 passes through the slot 29 near one end of the slot and the arm is pivotally attached to the pivot block by a pin (not shown) passing through the aperture 31 in the slot and a cooperating aperture 32 in the arm 13. As illustrated in FIG. 2, the pivot point is remote from the main vertical axis 37 of the hub by mounting the pivot block 11 on the upper surface of the hub by any suitable attachment means, such as rivets or screws, for example, so that the pivot point is spaced from the main vertical axis of the hub.

The arm 13 is generally T-shaped having a downwardly projecting member 33 with an outwardly projecting portion 35. The downwardly projecting member 33 fits into a generally radial slot 36 in the hub 17. The slot 36 does not project into the center of the hub, rather it only projects part way as illustrated in FIG. 2. The nonpivotally attached end of the arm 13 is notched 34 from the downwardly projecting member 33 outwardly for a predetermined distance so as to fit over the upper surface of the hub 17 in the manner illustrated in FIG. 2. The upper edge of this end of the arm is tapered downwardly.

The cylindrical hub 17 is in the general form of a spool, i.e., it has a horizontal lip at its upper and lower surfaces. In addition, to the slot 36, the hub 17 has a vertical cylindrical aperture 39 along its main vertical axis 37. The vertical cylindrical aperture 39 is designed to fit over the takeup reel shaft in a film or tape system in a manner well known in the art. Located adjacent to the vertical cylindrical aperture 39 along the main axis 37 is a second vertical cylindrical aperture 41 having an axis parallel to the main vertical axis and in line with the main axis and the vertical axis of the slot 36. The spring 15 fits inside of the second vertical cylindrical aperture 41 and attaches at one end to the arm 13 at a point above the notch in the arm through an aperture 42. Located adjacent to the second aperture 41 notches 43 in the upper and lower lips of the hub 17. The notches 43 are at right angles to the axis passing through the first and second vertical cylindrical apertures 37 and 39 and the slot 36 and as hereinafter described are adapted to hold the T end of the film or tape. The hub 17 has a downwardly projecting ring-shaped portion 45 best illustrated in FIG. 2. The ring-shaped portion 45 fits inside of a circular aperture 47 in the plate 19. The plate 19 has a second aperture 49 aligned with the second cylindrical aperture 41 in the hub through which the lower end of the coil spring 15 projects. Hence, the spring is held at one end by the arm 13 and at the other end by the plate 19.

The plate 19, hub 17, spring 15, arm 13, and the pivot block 11 are mounted and attached together to form a structure of the type illustrated in FIG. 2. That is, the ring-shaped portion 45 of the hub 17 fits inside the circular aperture 47 in the plate 19. The coil spring 15 passes through the second vertical aperture 41 in the hub and is connected to the plate 19 and the arm 13 in the manner heretofor described. The arm 13 is pivotally attached to the pivot block 11 at one end. And, the pivot block attached to the hub 17 by means not shown, such as rivets, screws, or bolts, for example. The downwardly projecting member 33 of the arm 13 is mounted in the slot 36 so that the outwardly projecting portion 35 projects outwardly from the hub 17 when the notch in the arm presses against the top of the hub.

As previously stated, FIG. 1 also illustrates at a tape 21 having a T-shaped end 23 as viewed in FIG. 1, the T is rotated 90° from its normal vertical plane to form a tab. The width of the tab end is generally equal the overall width of the hub 17 from lip to lip. The width of the tape 21 at the shank of the T is generally equal to the width of the part of a hub between the upper and lower lips. As illustrated in FIG. 1, the tape 21 passes between the drive roller 25 and the capstan 27 and is projected into the area of the takeup reel of the invention.

Figure 3B:
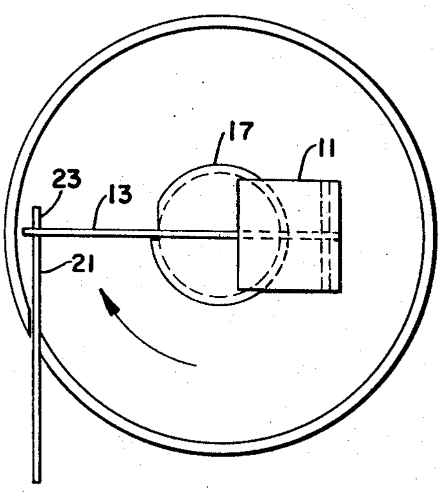
Figure 3C:
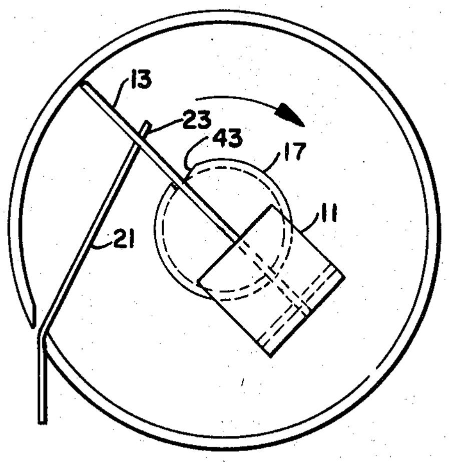
Figure 3D:
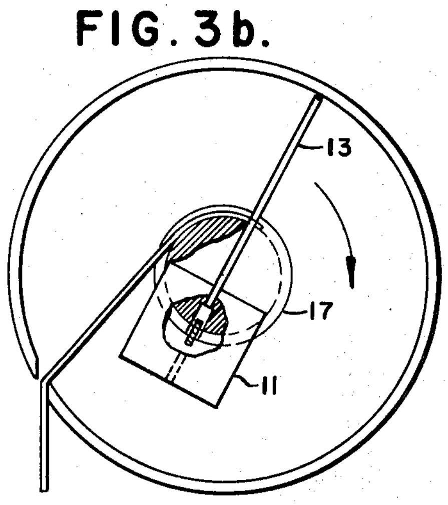
Figure 3E:
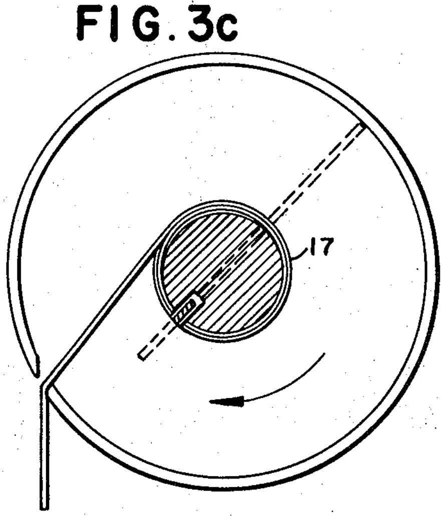

FIGS. 3*a*—3*e* illustrate in sequence how the tape 21 is picked up by the arm 13, moved into the notches 43, and wrapped around the hub 17. FIG. 3*a* illustrates the tape as it starts to project into the area of the takeup reel. The arm 13 is moving in a clockwise direction and, as illustrated in FIG. 3*b*, intersects the tape at a point back of the T-shaped end 23. As the arm continues to revolve, the end of the tape moves inwardly (FIG. 3*c*) toward the notches 43 where it is caught as illustrated in FIG. 3*d*. As the hub continues to revolve, the tape wraps around it as illustrated in FIG. 3*e*.

Figure 4A:
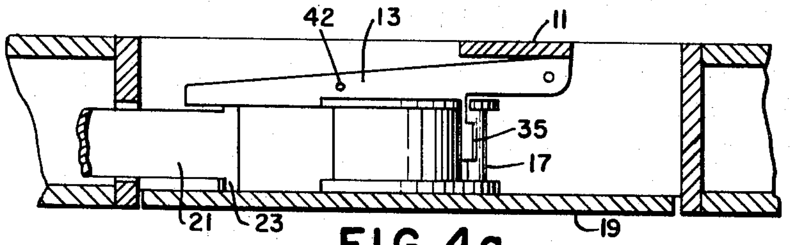
Figure 4B:
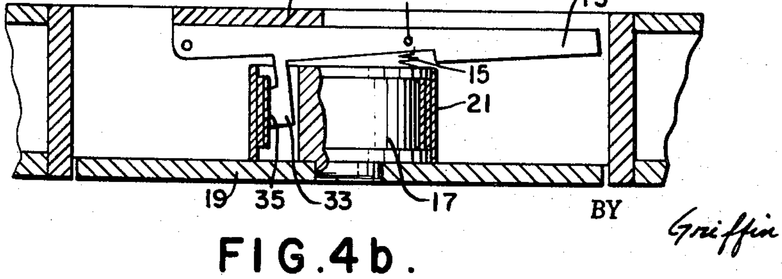

FIGS. 4*a* and 4*b* illustrate how tape pressure moves the arm 13 upwardly when the tape is wrapped around the hub 17. More specifically, FIG. 4*a* illustrates the point in the sequence when the outer end of the arm catches the T-shaped end 23 of the tape 21 and starts to move it toward the notches 23. When the tape starts to wrap around the hub 17, it presses against the outwardly projecting portion 35 of the downwardly projecting member 33 of the arm 13. This pressure causes the outwardly projecting portion 35 to move inwardly thereby causing the arm to pivot in the pivot block 11 against the coil spring pressure. After sufficient wrapping force is created, the arm is raised out of further contact with the tape 21. In this manner, the arm is easily and simply moved out of contact with the tape.

It will be appreciated, that it is much easier and more reliable to move the arm out of contact with the tape by tape pressure of the type created by the invention than it is move to move the arm out of contact with the tape by tape edge pressure, as is done by prior art devices. It will also be appreciated that the invention as herein described, does not have an arm that extends upwardly to create a dangerous moving obstacle. In addition, the invention does not have to be as delicately formed as do prior art takeup reels that depend on edge contact to raise their arms.

It will be appreciated that the foregoing has described a preferred embodiment of the invention and that the invention can be modified within the light of that description. For example, slightly different pivot means than those specifically described can be provided. In addition, the end of the tape or film can be L shaped as opposed to T-shaped. Moreover, the end of the tape or film can be a "leader" as opposed to the actual tape or film. Hence, the invention can be practiced otherwise than as specifically described herein.

I claim:

1. A takeup reel for use in a self-threading system comprising:
   - a hub having a vertical slot for receiving the downwardly projecting element of an arm;
   - an arm pivotally attached to the top of said hub having a downwardly projecting element projecting into the vertical slot in said hub, said downwardly projecting element having an outwardly projecting portion, said portion projecting outwardly from said hub when said arm is in a predetermined position; and,
   - a spring connected to said arm and said hub for holding said arm in said predetermined position, but allowing said arm to pivot with respect to said hub when a tapelike material is wrapped around said hub and presses against said outwardly projecting portion.

2. A takeup reel for use in a self-threading system as claimed in claim 1 including a pivot block attached to said hub and projecting outwardly therefrom, said arm being pivotally attached to said pivot block.

3. A takeup reel for use in a self-threading system as claimed in claim 2 wherein said hub includes a vertical spring aperture and wherein said spring is a coil spring and fits into said vertical spring aperture in said hub, one end of said coil spring being attached to said arm and the other end being attached to said hub.

4. A takeup reel for use in a self-threading system as claimed in claim 3 wherein said tape like material has a T-shaped end and wherein said hub has upper and lower lips that are notched at predetermined positions to receive said T-shaped end.

5. A takeup reel for use in a self-threading system as claimed in claim 4 including a plate attached to the lower end of said hub, said coil spring being attached to said plate at one end.

6. A take takeup reel for use in a self-threading system as claimed in claim 5 wherein said arm has a notched portion from said downwardly projecting element to a predetermined outward position sufficient so that said notched portion of said arm can fit over the upper lip of said hub between said slot and said notch in the upper lip of said hub.

7. A takeup reel for use in a self-threading system as claimed in claim 1 wherein said hub includes a vertical spring aperture and wherein said spring is a coil spring and fits into said vertical spring aperture in said hub, one end of said coil spring being attached to said arm and the other arm end being attached to said hub.

8. A takeup reel for use in a self-threading system as claimed in claim 7 wherein said tape like material has a T-shaped end and wherein said hub has upper and lower lips that are notched at predetermined positions to receive said T-shaped end.

9. A takeup reel for use in a self-threading system as claimed in claim 1 wherein said tape like material has a T-shaped end and wherein said hub has upper and lower lips that are notched at predetermined positions to receive said T-shaped end.

10. A take-up reel for use in a self threading system as claimed in claim 9 wherein said arm has a notched portion from said downwardly projecting element to a predetermined outward position sufficient so that said notched portion of said arm can fir over the upper lip of said hub between said slot and said notch in the upper lip of said hub.